March 15, 1966   F. K. ALLEN   3,241,015
POSITIONAL SERVO SYSTEM
Filed Dec. 26, 1961   4 Sheets-Sheet 1

INVENTOR.
FRANCIS KEMPTON ALLEN
BY
*FRASER & BOGUCKI*
ATTORNEYS

March 15, 1966     F. K. ALLEN     3,241,015
POSITIONAL SERVO SYSTEM

Filed Dec. 26, 1961     4 Sheets-Sheet 2

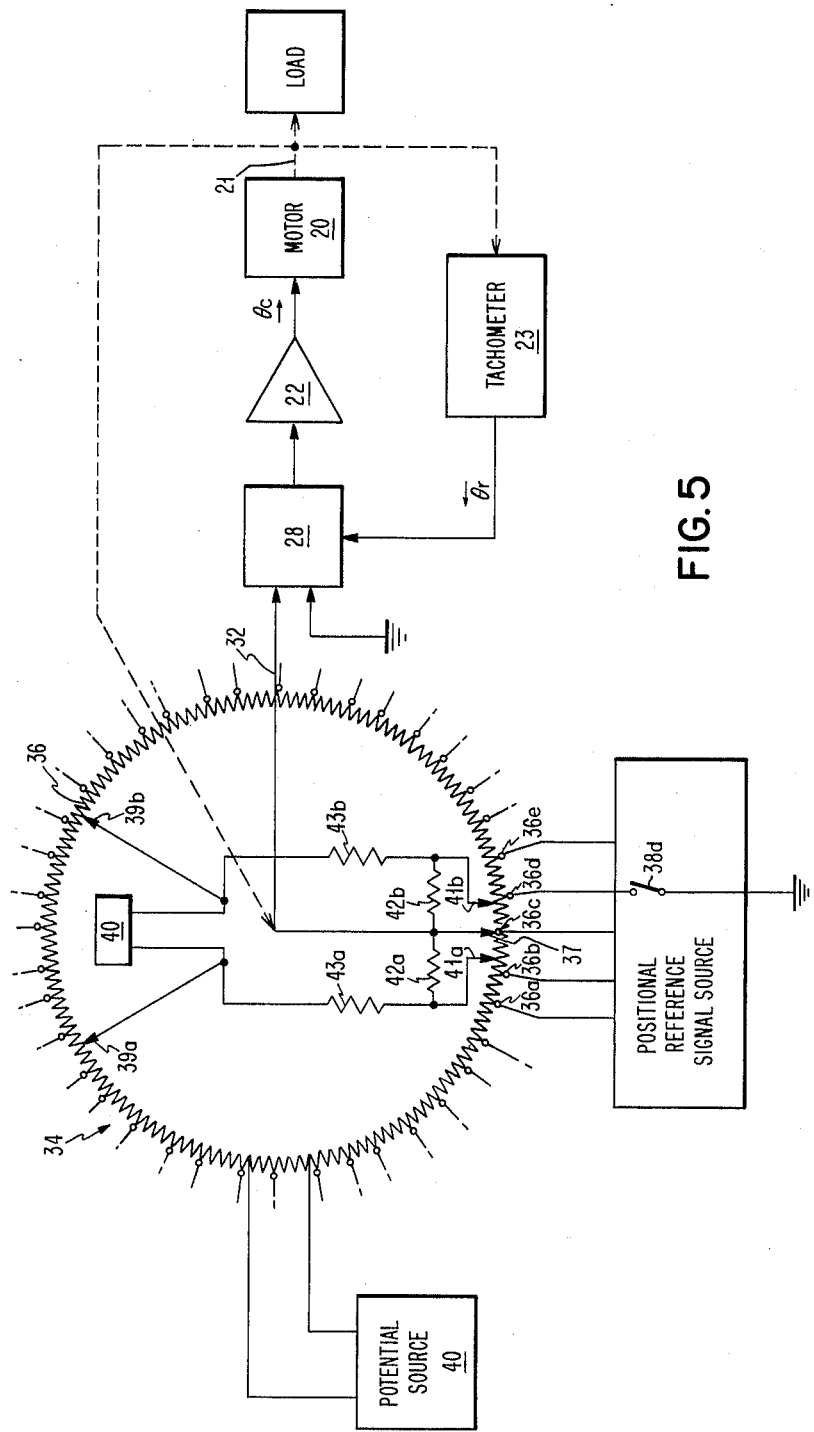

3,241,015
POSITIONAL SERVO SYSTEM
Francis Kempton Allen, Campbell, Calif., assignor to International Business Machines Corporation, New York, N.Y., a corporation of New York
Filed Dec. 26, 1961, Ser. No. 162,140
7 Claims. (Cl. 318—18)

This invention relates to a servomechanical positional control system and more particularly to a positional control system having an improved response characteristic to a step input.

Conventional closed-loop positional control systems are comprised of an arrangement for driving a load to selected positions, signaling circuitry for generating a positional error signal indicative of the difference between the position of the load and the selected position, and control circuitry responsive to the error signal for operating the driving arrangement in such a manner as to reduce the error signal and the positional error to zero. A theoretically-perfect positional control system would operate (1) to drive the load along the shortest path to a selected position, (2) to drive the load to the selected position in the shortest possible time and (3) to stop at the selected position with no oscillatory motion.

In conventional closed-loop positional control systems, the control circuitry is responsive to the error signal in a manner such that an increase therein produces an increased output signal for operating the driving arrangement. To obtain a fast response to drive the load to the selected position in the shortest possible time in a conventional system, the gain of the control circuitry may be increased. This increase in gain increases the signal furnished to the driving arrangement in response to an error signal of any given amplitude and thereby accomplishes a faster drive of the load. On the other hand, with increased gain the system inertia may cause the load to overshoot the selected position and display a damped oscillatory mode about the position. For this reason, the design of conventional closed-loop positional control systems generally requires a compromise between the speed of response in moving the load to the selected position and the time required for stopping at the position, the compromise being adapted to the particular combination of driving arrangement and load utilized.

It has been determined that in a conventional closed-loop control system, the rate at which the oscillatory mode subsides (the damping rate) may be increased by providing to the control circuitry an additional signal which is indicative of the velocity of the load. The additional velocity-indicative signal (termed the "rate signal") may be combined with the positional error signal by the control circuitry to increase the damping rate. As will be understood, increasing the amplitude of the rate signal relative to the amplitude of the positional error signal increases the damping action. When provision is made for an increased damping rate, the system is not operated to reduce positional error in a minimum time, however.

One type of positional control system which operates to make maximum use of the power capabilities of the driving arrangement is the so-called "saturated" or "bang-bang" controller. Basically, a bang-bang controller is a servomechanical positional control system wherein the driving arrangement is operated at maximum acceleration until the midpoint between the initial and selected positions is reached and at maximum deceleration from the midpoint to the selected position. Theoretically, such a system will provide an optimum drive between positions with minimum oscillation about the selected position since the equal but opposite accelerations which switch at the midpoint position provide that zero velocity is reached at the selected position. A bang-bang control system is realized by replacing the amplifying control arrangement of a conventional system with a bidirectional switching arrangement which provides an output signal of constant amplitude. The switching arrangement operates the driving arrangement at maximum acceleration in a first direction in response to an input signal of one polarity and at maximum acceleration in the opposite direction in response to an input signal of opposite polarity. A bang-bang control system is generally simple and of rugged construction and is adaptable to many situations where three states or conditions are necessary; for example, the bang-bang control system may be used to control the rudders of a missile or the like where "left full rudder," "right full rudder" and "center rudder" are the desired control positions. Such a system may also find use in a conveyor arrangement operating on a random selection principle.

Bang-bang control systems, however, have been limited in application because of certain inherent operational difficulties. For example, the application of opposite maximum accelerations at the midpoint places a substantial strain on the system. Furthermore, where rapid response is necessary or where distances between positions vary, it is extremely difficult to determine the midpoint between positions at which point the energization of the drive mechanism must be reversed. And, even where the midpoint is accurately determined, the switching speed of the control arrangement must be sufficient for the function sought to be controlled. If acceleration is not switched at the midpoint, the system will not reach exact zero acceleration at the selected position and will oscillate thereabout since maximum acceleration will be applied for any error.

Although no simple means has been suggested heretofore for determining the midpoint position to accomplish rapid and accurate switching thereat, it appears that a novel arrangement utilizing a positional error signal and a rate feedback signal might be utilized to provide a responsive and accurate bang-bang like control system having substantial advantages.

Accordingly, it is an object of this invention to provide an improved positional control system having minimum response time.

It is another object of this invention to provide an improved positional control system having minimum overshoot response.

It is an additional object of this invention to provide a bang-bang like positional control system employing control circuitry responsive to both the positional error signal and a rate feedback signal.

It is a further object of this invention to provide control circuitry for a bang-bang like positional control system capable of accurately determining the positional error midpoint.

Another object of this invention is to provide a means for stiffening the positioning of the load at the selected position in a positional control system.

In accordance with one aspect of this invention, there is provided a means for improving the response of a closed-loop positional control system of the bang-bang type by the utilization of a rate feedback signal. More particularly, there is provided in a positional control system a first means for generating a rate feedback signal and a second means for generating a signal indicative of the square root of the difference between any instantaneous intermediate position and a preselected one of a plurality of mutually exclusive discrete reference positions (an error signal). These two signals may be subtractively combined to provide a signal for determining the load midpoint position. This difference signal is applied to a low level saturation amplifier which provides signals for controlling a driving arrangement. The amplifier output signals are proportional to the difference between the positional error and rate signals until the difference reaches the saturation level. For differences greater than the saturation input, the amplifier provides a maximum constant output signal. The sense of the amplifier control signal is dependent on the polarity of the difference signal. In effect, the system operates as a fixed acceleration, bang-bang controller at all times except when the difference signal is less than the input saturation figure; there the system operates as a conventional system. Since the difference signal approaches zero at the midpoint and at the selected position, the system provides graduated switching at the midpoint to eliminate switching stresses, a null seeking characteristic (stiffness) to eliminate oscillation at the selected position, and maximum drive at all other points. The system thus provides the best characteristics of both conventional and bang-bang systems.

In one specific arrangement of the invention wherein a motor is employed for driving a load to one of a number of positions in a rotary conveyor system, a circular potentiometer having a circular resistance element is associated with a rotating central position-determining wiper contact. Two additional wiper contacts are provided adjacent the central contact, for providing the appropriate scaled function of the position necessary for accurate midpoint determination and for assuring stiffening about a selected reference position.

A better understanding of the invention may be had from the following description taken together with the accompanying drawings in which:

FIG. 5 is a combined block and schematic diagram of a preferred arrangement of the invention;

In the drawings, like reference characters refer to like elements and primed reference characters to substantially analogous elements.

Figure 1:
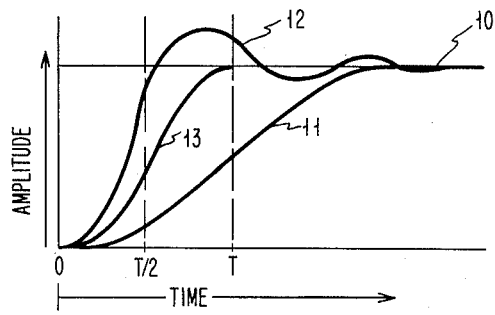
FIG. 1 is a graphical illustration of the responses of several representative systems including the device of this invention.

Referring to FIG. 1, there is shown a time history of the responses to a stepped input signal (indicated as curve 10) of several representative systems including the device of this invention. Curve 11 demonstrates the sluggish, time-consumptive response of an overdamped system. Curve 12 demonstrates the fast response with attendant transient overshoot of a high gain or underdamped system. The inertia of the high gain system contributes an oscillatory mode which, while damped or decaying with time, is undesirable since it allows the load to oscillate about the selected position for a period before coming to rest.

An ideal bang-bang controller system would have the response to a step input indicated by curve 13, practically as does the system of this invention. Such a response is seen to build to the desired position without overshoot within the acceptable time interval, T. The velocity of such response (as indicated by the slope of curve 13) is seen to build to a maximum within one-half of the time interval T.

Figure 2:
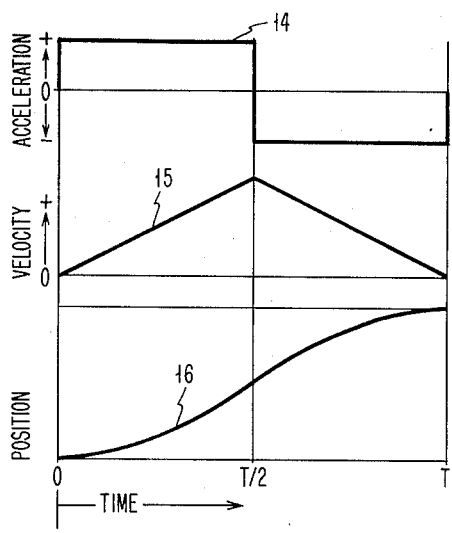
FIG. 2 is a graphical illustration of the acceleration, the velocity and the positional response of an ideal device illustrating the principles of the invention.

Referring to FIG. 2, there is illustrated the response of a perfect bang-bang control system to a bidirectional acceleration of fixed amplitude, indicated as curve 14. The acceleration is seen to be programmed for a positive sense for an initial time interval from 0 to $T/2$ and for a negative sense for a like time interval from $T/2$ to T. The velocity response (the first integral of the acceleration curve 14) is indicated by curve 15 for a system initially at rest. The velocity is seen to rise linearly from an initial value of zero to a maximum at the point of switchover of the acceleration at time $T/2$ and then to decrease linearly to zero at time T. The positional response (the second integral of curve 14) for a system initially at rest is indicated by curve 16 and it will be recognized that this is the desired response indicated by curve 13 in FIG. 1.

As discussed hereinbefore, the response and the rate of damping of a positional control system may be made to approximate that shown in FIG. 2 without the detriments of null oscillation and physical stress caused by midpoint switching by utilizing a rate signal and a positional error signal to determine an accurate midpoint position. If the midpoint is accurately determined, maximum acceleration may be applied to the driving arrangement until substantially the midpoint position is reached. Then a graduated switching acceleration is applied from one maximum drive to the opposite maximum drive; thereafter maximum reverse acceleration (deceleration) may be applied until substantially the selected position is reached at which time a gradual reduction is accomplished to zero so that no overshoot will take place about the reference position.

The midpoint position may be determined from the aforementioned two signals as will be demonstrated from the following analysis.

The velocity at which a load is driven may be expressed as:

$$V(t) = aT \qquad (1)$$

and the displacement of the load may be expressed as:

$$D(t) = \tfrac{1}{2} aT^2 \qquad (2)$$

where:

$D(t)$ = displacement as a function of time,
$V(t)$ = velocity as a function of time,
$a$ = a constant acceleration,
$T$ = a time interval at the beginning of which all initial conditions are zero (e.g. $V(0), D(0) = 0$).

Time, as a parameter, may be eliminated from the relation between Equations 1 and 2 by rearranging each of Equations 1 and 2 to solve for T and then equating the results to give the following:

$$\frac{V(t)}{a} = \sqrt{\frac{2D(t)}{a}} \qquad (3)$$

or $$V(t) = \sqrt{2aD(t)} \qquad (4)$$

With the desired system function of midpoint switchover of the sense of the fixed acceleration $a$, the displacement $D(T/2)$ traveled to the midpoint is equal to the distance left to be traveled to the desired position, in other words, to the positional error existing at the midpoint position $E(T/2)$. Therefore, the system midpoint positional error $E_{(T/2)}$ may be substituted for $D_{(T/2)}$ in Equation 4:

$$V_{(T/2)} = \sqrt{2aE_{(T/2)}} \qquad (5)$$

The midpoint between initial and reference positions is thus reached when the velocity and the square root of the scaled positional error signal $\sqrt{2aE(t)}$ are equal. The ideal bang-bang like positional control system may thus be realized by providing an input to the saturating amplifier comprised of the difference between the rate signal and a signal equal to the square root of twice the fixed acceleration multiplied by the positional error. In this manner, the amplifier will be provided an input which changes in polarity at the midpoint position. A saturating amplifier may react to provide opposite maximum accelerations with appropriate graduated accelerations at the mid and the selected reference points.

Accordingly, a saturating amplifier may be employed to reverse the sense of a driving arrangement in response to a reversal in sense of the difference between a rate signal and a scaled signal indicative of the square root of the positional error signal, thereby providing an accurate notation of midpoint position. A metering arrangement adapted to measure the output of the driving arrangement may be used to obtain a rate signal indicative of velocity; a pickoff potentiometer, to obtain a signal indicative of positional error; and a function generator, to operate upon the positional error signal to provide the requisite scaled square root signal.

Figure 3:
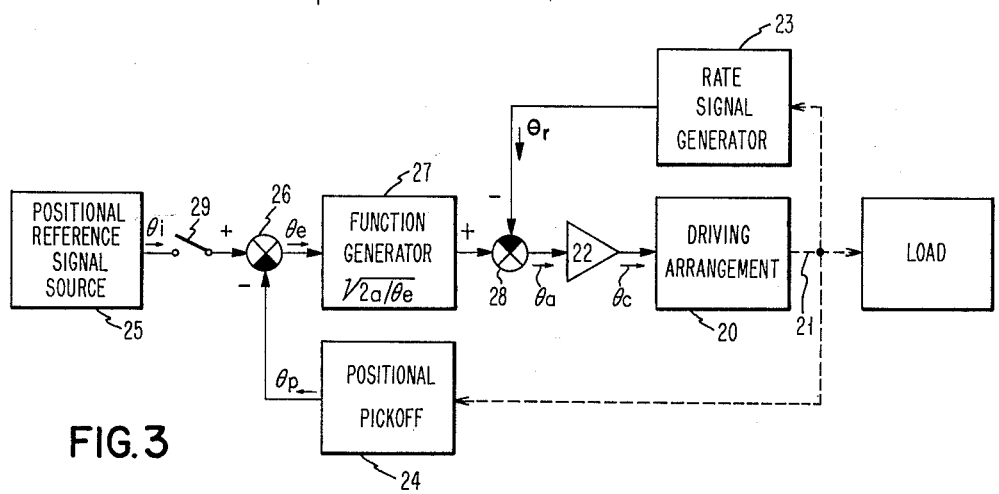
FIG. 3 is a functional block diagram of a system embodying the concept of the invention.

Referring to FIG. 3, there is illustrated a functional block diagram of a system embodying the concept of the invention. There is provided a driving arrangement 20 having an output device 21 for driving a load. A saturating amplifier 22 is disposed in a manner to provide for operation of the driving arrangement 20. A rate signal generator 23 is adapted to measure the output rate of the device 21 for providing rate feedback signals indicative of the output velocity of driving arrangement 20, and a positional pickoff 24 is connected to device 21 for providing positional reference signals indicative of the position of the device 21. A positional reference signal source 25 is adapted to provide an input signal $\theta_i$ comprising one of a plurality of individual positional reference signals. The input signal $\theta_i$ from source 25 is compared with the positional reference signal $\theta_p$ at a summing circuit 26 to provide an error signal $\theta_e$ for driving a function generator 27. Function generator 27 is adapted to produce from error signal $\theta_e$ an output representative of the square root of twice the acceleration multiplied by the positional error signal $\theta_e$. The output of the function generator 27 and the rate generator 23 are subtractively combined by a summing sense-determining circuit 28 to provide a signal $\theta_a$ to operate the saturation amplifier 22 for the control of the driving arrangement 20.

In the normal operation of the system in FIG. 3, the application of a step reference signal $\theta_i$ to the circuit 26 by means of a switch 29 and of a positional signal $\theta_p$ causes an error signal $\theta_e$, to be developed at the output of the circuit 26. The error signal $\theta_e$ is processed by the function generator 27 and applied to the bidirectional saturating amplifier 22. The amplifier 22 is adapted to provide control signals $\theta_c$ of a sense to operate the driving arrangement 20 in a direction determined by the polarity of the input signal $\theta_a$. Because the system is initially at rest with a maximum error signal $\theta_e$ and no rate signal $\theta_r$, the initial signal saturates the amplifier 22 causing it to apply a constant maximum signal to the driving arrangement 20. As the driving arrangement 20 accelerates in response to the initial control signal $\theta_c$, the output from the generator 23 rises from zero. The rate signal $\theta_r$ from the generator 23 is fed back to the circuit 28 in a sense initially to oppose the sense of the positional error signal $\theta_e$.

Because the initial control signal $\theta_c$ applied to the driving arrangement 20 from the amplifier 22 in response to a finite signal $\theta_a$ from the circuit 28 is of fixed amplitude until the difference signal $\theta_a$ becomes less than the saturation level, only the sense of the control signal $\theta_c$ from amplifier 22 is determined thereby. As the speed of the driving arrangement 20 increases, no change in the sense or amplitude of the control signal $\theta_c$ occurs until the decreasing output signal from the function generator 27 less the increasing rate signal $\theta_r$ becomes less than the saturating input level.

When the difference signal $\theta_a$ drops below the saturating level, the amplitude of the control signal $\theta_c$ drops until the rate signal $\theta_r$ from the generator 23 exceeds that from the function generator 27. At this point the sense of the difference signal $\theta_a$ reverses, reversing the direction and increasing the amplitude to the saturation level of acceleration applied to the arrangement 20. Such a reversal of acceleration serves to brake the driving arrangement 20, decreasing its velocity. Coincidentally the positional error signal $\theta_e$ is being further reduced, so that the rate signal $\theta_r$ and the positional error signal $\theta_e$ approach zero together, the output of the circuit 28 is reduced below the saturation level producing a decaying control signal $\theta_c$ which comes to zero causing the driving arrangement 20 to stop at the selected position.

Figure 4:
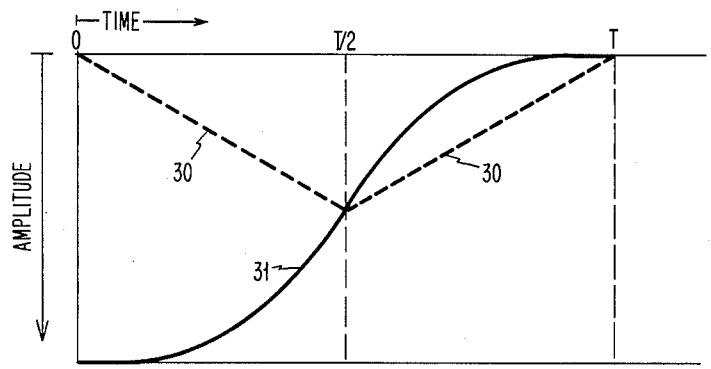
FIG. 4 is a graphical illustration of the response of the system of FIG. 3 to a step input signal.

Referring to FIG. 4, there is illustrated an exemplary time history of response of the system of FIG. 3 to a step input of positive sense. The time interval between zero and T represents the response time of the system. $T/2$ represents the point in time at which the sense of the control signal $\theta_c$ is switched, while T represents the point in time at which the control signal $\theta_c$ is switched off. Curve 30 represents the rate signal $\theta_r$ from the generator 23. Curve 31 represents the scaled positional error signal (the sense of which is reversed for convenience in comparative representations with the rate signal $\theta_r$) derived from the function generator 27. It will be noted that the last-mentioned signal (equal to the square root of the product of twice the constant acceleration characteristic and the positional error signal $\theta_e$) at time $T/2$ is equal to the magnitude of the rate signal $\theta_r$, thereby satisfying the requirements of equation 5.

Referring to FIG. 5, there is illustrated a preferred embodiment of the device of the invention. In this embodiment the functions of the source 25, the circuit 26 and the generator 27 are combined within a single structure, as will be explained hereinafter. There is provided a motor 20 having an output shaft 21, and a saturation amplifier 22 connected for providing bidirectional input signals to the motor 20. The motor 20 is designed to have a relatively constant torque over its entire speed range. The saturation or maximum velocity of the motor 20 is selected to be greater than the velocities required for the intended application. The amplifier 22 is advantageously such as to provide a common bidirectional saturation level for operating the motor 20 and is arranged to saturate at a relatively low input level.

The combination of the gain and the saturation limit of the amplifier 22 are selected to provide a maximum control signal $\theta_{c(max)}$ for accelerating the motor 20 in response to all intial step inputs at and above the smallest discrete increment employed as a reference positional input signal to the system.

The arrangement of FIG. 5 also includes a tachometer 23 connected to measure the rotational velocity and direction of the output shaft 21 for providing feedback rate signals. A signal indicative of the square root of the difference between a preselected reference position and the system output position is provided on conductor 32. The last-mentioned signal is subtracted from the rate signal $\theta_r$ from the tachometer 23 by suitable means such as series summing resistors (not shown) located within the sense determining circuit 28.

A signal indicative of the positional error signal is generated by means of the assembly 34. The assembly 34 comprises a potentiometer having a closed-loop resistive element 36 and a pickoff wiper contact 37, rotatably mounted relative to the fixed resistive element 36 and in driven relationship with the shaft 21. Taps 36($a,b,c$ . . .) are connected at successive increments along the resistive element 36 in positions representative of the various selectable positions of the load. A normally-open switch 38($a,b,c$ . . .) connects each of the taps 36($a,b,c$ . . .), respectively, to a source of signal such as a ground potential.

There is also provided a first and a second pair of function generator wiper contacts mounted in fixed relation relative to and symmetrically displaced about pickoff wiper contact 37 for electrically engaging the resistive element 36. A first pair of wiper contacts 39$a$ and 39$b$, with a source of potential 40 connected therebetween, are each oppositely displaced at equal angular distances from the pickoff wiper contact 37. A second pair of wiper contacts 41$a$ and 41$b$ are interposed between the first pair of wiper contacts 39$a$, 39$b$ and the pickoff wiper contact 37, each wiper contact 41$a$, 41$b$ of the second pair being oppositely displaced from pickoff wiper contact 37. Likevalued resistors 42$a$ and 42$b$ are connected in circuit between the pickoff wiper contact 37 and a corresponding one of the function generator wiper contacts 41$a$ and 41$b$. A resistor 43$a$ is connected between wiper contacts 39$a$ and 41$a$, and a resistor 43$b$ is connected between wiper contacts 39$b$ and 41$b$ to arrange the source 40 across the contacts 41$a$ and 41$b$.

In the construction of a particular embodiment of the function generator assembly 34 for a rotary system application, the following specifications were employed. The resistive element 36 of the potentiometer was ring-shaped and had a diameter of 4¾ inches and a lineal unit resistance of 16,000 ohms per inch. The wiper contacts 39$a$ and 39$b$ were each oppositely displaced 150° from the pickoff wiper contact 37, and the wiper contacts 41$a$ and 41$b$ were each oppositely displaced 5° from the pickoff wiper contact 37. The resistance of each of the resistors 42$a$ and 42$b$ was 1,100 ohms, and the resistance of each of the resistors 43$a$ and 43$b$ was 3,300 ohms.

By means of the above-described arrangement 34, illustrated in FIG. 5, the signal voltage appearing across the section of the potentiometer 36 between the pickoff wiper contact 37 and a selected one of taps 36($a,b,c$ . . .) is proportionate to the square root of the angular displacement increment therebetween, as will be explained hereinafter.

Figure 6:
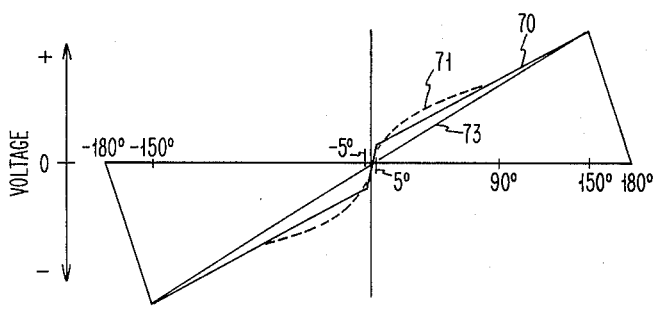
FIG. 6 is a graphical illustration comparing the output response of the arrangement of FIG. 5 with an ideal square root function.

Referring to FIG. 6, there is shown a graph comparing the response of the system of FIG. 5 with that of the ideal function generator 27 described in FIG. 3. The curve 70 illustrates the voltage output of the arrangement 34 as a function of rotational position with the contact 37 at the reference position. Curve 71 illustrates the ideal square root function of the generator 27. It is to be observed that for a preselected reference position of 180°, an ambiguity exists in that the system error signal indicated is zero. For preselected positions represented by taps lying upon the resistive element along the shortest arc segment intercepted by wipers 39$a$ and 39$b$ (the arc segment not including the position of the wiper 37), a reverse gain gradient exists.

In operation, an input signal is generated by closing one of the switches 38 (for example switch 38$d$). This closure applies ground potential at the tap 36$d$, distorting the voltage gradient of curve 71 and applying a square root signal via conductor 32 to the circuit 28. This signal is combined with the zero rate signal to furnish a maximum acceleration drive via amplifier 22 to the motor 20. From that initial signal the system operates as explained hereinbefore to reduce the error in a minimum time.

Also described in FIG. 6 is curve 73, which represents the voltage distribution around the element 36 without the extra wiper contacts 41$a$, 41$b$. It will be noted that without the additional contacts the voltage gradient adjacent the null reference position is low compared to that of the desired curve 71 so that maximum deceleration is not applied to damp the load thereby to realize a substantially ideal system. However, by the use of the additional wiper contacts 41$a$, 41$b$ of this invention, an increased voltage is superimposed upon the element 36, distorting the conventional voltage gradient between the contacts 41$a$ and 41$b$, immediately adjacent the wiper contact 37. This distortion is most pronounced at the null reference point where the absolute voltage is less and the system is forced to operate at maximum deceleration. From the curve 70, it is apparent that the use of the additional wiper contacts 41$a$, 41$b$ furnishes a voltage distribution substantially identical to the ideal square root curve 71, thereby accomplishing the accurate midpoint switching desired. Though not shown, it has been determined that the dynamic distribution of voltages obtained by the distorting contacts 41$a$, 41$b$ closely approaches the ideal characteristic.

In addition to the advantages just described, it should be noted that the additional wiper contacts 41$a$, 41$b$ immediately adjacent the positional contact 37 of this invention provide (by the increased voltage gradient imposed about the reference position) a stiffening action whereby the load may be electrically held in a reference position without additional mechanical contrivance.

Figure 7:
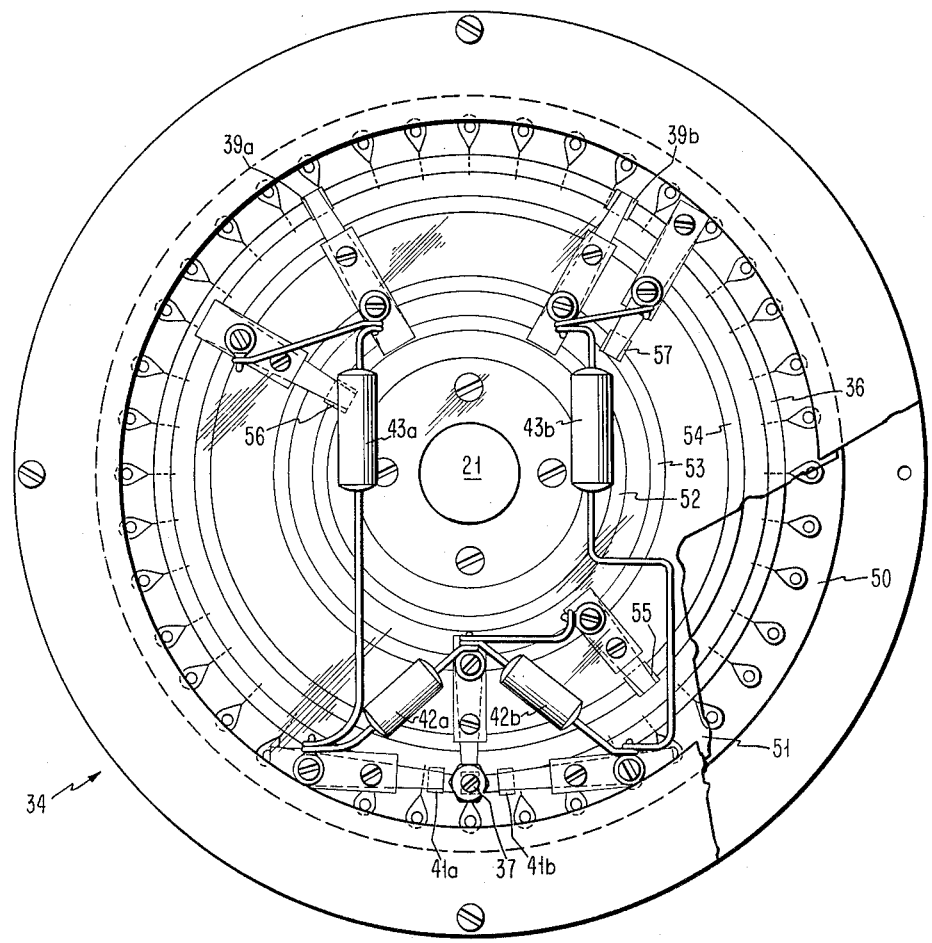
FIG. 7 is a further illustration of the arrangement shown in FIG. 5.

While the electrical features of the preferred embodiment of assembly 34 have been described and illustrated in FIGS. 5 and 6, the mechanical features of such embodiment are more particularly described in FIG. 7 wherein a preferred embodiment of the assembly 34 is shown. The assembly 34 includes the mechanical combination of a slip ring mount 50 and a wiper arm assembly 51, rotatably mounted thereupon. Slip ring mount 50 is adapted to be mounted upon a motor assembly, while wiper arm assembly 51 is adapted to engage the output shaft 21 of such motor assembly. Slip ring mount 50 comprises a nonconductive material having four mutually concentric circular conductive elements fixedly mounted thereon including a resistive element 36, first and second excitation slip rings 52 and 53, and a third takeoff slip ring 54. Each of the slip rings 52, 53 and 54 is constructed of a material having a flow lineal unit resistance relative to element 36 (for example, a substantially zero resistance Markite material), and each has provided a tap thereon for convenience in making external electrical connections.

Wiper arm assembly 51 is comprised of a nonconductive material such as plexiglass and has five spring loaded potentiometer wiper contacts 37, 39$a$, 39$b$, 41$a$ and 41$b$, and three brushes 55, 56 and 57 mechanically mounted in fixed relation thereto. The brushes 56 and 57 are adapted to provide predetermined potentials to the contacts 39$a$ and 39$b$. The five potentiometer wiper contacts 37, 39$a$, 39$b$, 41$a$ and 41$b$ are arranged for electrically engaging resistance element 36. Brushes 55, 56 and 57 are arranged for electrically engaging slip rings 54, 52 and 53, respectively. The four resistors 42$a$, 42$b$, 43$a$ and 43$b$ are mechanically mounted to the wiper arm assembly 51 and electrically connected in circuit, as outlined supra and as illustrated in FIG. 7 and FIG. 5. The contacts 39$a$ and 39$b$ provide the normal potential to furnish a gradient around the element 36. The contacts 41$a$ and 41$b$ superimpose a second potential on that gradient adjacent the center contact 37. The center contact 37 senses the potential at the immediate load position to provide the requisite square root signal.

While a preferred embodiment has been described in general terms, it is to be understood that the principles of the invention are equally applicable to both alternating current and direct current systems, the adaptations therebetween being well known to those skilled in the art.

Further, while a specific form of function generator employing two pairs of wiper contacts in addition to the center contact has been described and illustrated, it is to be understood that any form of function generator employing a plurality of pairs of wiper contacts and associated resistance elements may be used, whereby the combination of the arrangement of the wipers and the resistance values of the resistors employed describe a potentiometer impedance which provides a voltage that varies as the square root of the displacement difference between a preselected tap and the pickoff wiper of the potentiometer.

For a lineal conveyor system employing a translational or lineal pickoff element rather than a rotary potentiometer, the circuit and circuit parameters or ratios for assembly 34 would be the same; however, the form and geometry of the function generator would be somewhat different. For example, bus bars and trolleys would replace the slip rings and brushes of FIG. 7.

Figure 8:
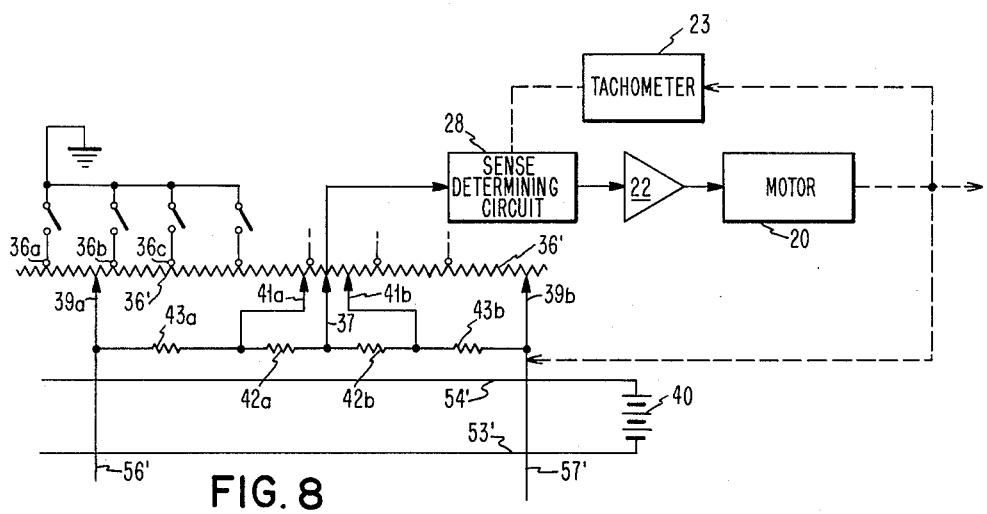
FIG. 8 is a diagrammatic illustration of an alternative arrangement of the invention.

Referring to FIG. 8, there is illustrated a functional schematic of an assembly adapted for use in a translational control system. There is provided a lineal potentiometer resistive element 36′ which is equivalent to the potentiometer resistive element 36 of FIG. 5. There are also provided bus bars 53′ and 54′ which are functionally analogous to slip rings 53 and 54 and brushes 56′ and 57′ slidably connected to bus bars 53′ and 54′, respectively, and serving the same functional purpose as brushes 56 and 57, respectively, of FIG. 7.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A servomechanical system including the combination of a motor having an output shaft, a first means coupled to said shaft for providing a signal indicative of the position of said shaft, a second means for generating a plurality of mutually exclusive signals corresponding to reference positions of said shaft, means operative responsive to signals from said first and second means for providing a signal proportional to the square root of the difference between the position of said shaft and a preselected one of said reference positions, velocity signal means coupled to said shaft for providing a signal indicative of the velocity of said shaft, a saturating amplifier responsive to said velocity signal and said square root signal for providing a control signal, and means coupling said motor to said amplifier.

2. A positional control system for driving a load to one of a plurality of mutually exclusive discrete output positions including the combination of a motor having an output shaft, a saturating amplifier connected for bi-directional operation of said motor, a tachometer coupled to said shaft for providing signals indicative of the speed and direction of said motor, a function generator including a positional pickoff potentiometer coupled to said shaft for providing positional error signals indicative of the square root of twice the acceleration multiplied by the difference between the position of said shaft and a preselected one of said output positions, said potentiometer comprising a closed-loop resistive element having a plurality of taps representing said plurality of discrete output positions, switch means for selectively connecting one of said taps in circuit with said amplifier, and means coupling said amplifier to the output from said function generator and said tachometer for switching said motor on at such times and in such senses as to cause said shaft to move to said preselected one of said output positions within a minimum time interval.

3. A closed-loop positional control system comprising a motor having a shaft coupled to a load; a tachometer coupled to measure the directional velocity of said shaft and to provide a signal indicative of said velocity; a potentiometer having a resistive element with positions thereon corresponding to preselected positions of said shaft, a shaft-position-indicating contact in conducting relation with said resistive elements and coupled in a driven relationship with said shaft, means providing equal potentials of opposite sense along said resistive element on opposite sides of said contact, and means for increasing the gradient of the potentials immediately adjacent said contact; means for deriving a positional signal between said contact and a selected one of said positions; and means operative responsive to the difference between the positional signal and the velocity signal for providing a signal of a fixed maximum amplitude to said motor of a sense determined by the sense of said difference.

4. A control system in accordance with claim 3 wherein said means for increasing the gradient of potentials immediately adjacent said contact comprises second and third contacts in conducting relation with said resistive element and in driven relationship with said shaft, said second and third contacts being positioned at equal distances on opposite sides of said shaft-position-indicating contact, respectively; and means for providing a predetermined potential between said second and third contact.

5. A control system in accordance with claim 4 wherein said second and third contacts are respectively placed at five degrees on opposite sides of said shaft-position-indicating contact, and wherein said predetermined potential is less than the sum of said equal potentials.

6. A positional control system including the combination of a motor having an output shaft; a tachometer coupled to the motor shaft for providing signals indicative of the speed and direction of said motor; a function generator including a potentiometer having a resistive element and a plurality of contact wipers movable relative to and in electrical contact with said element; said plurality of wipers including a pick off wiper, a first pair of wipers symmetrically displaced from and mounted in fixed relation to said pick off wiper, and a second pair of wipers symmetrically displaced from said pick off wiper and individually interposed between said pick off wiper and one of said first pair of wipers; a source of electrical potential connected across said first pair of wipers; a plurality of resistors connecting adjacent ones of said wipers excluding the wipers of said first pair of wipers; a plurality of taps connected to said resistive element representing a plurality of discreet output positions; the values of the resistance of said resistors relative to said resistive element and the displacement of said symmetrically displaced pairs of wipers relative to said pick off wiper providing an impedance between a preselected one of said taps and said pick off wiper which is a function of the square root of the displacement of said tap relative to the point of electrical contact of said pick off wiper with said resistive elements; means coupling said motor shaft to said plurality of wipers; means for selectively connecting said amplifier to said function generator and said tachometer for energizing said motor to cause said shaft to move to a preselected one of said output positions.

7. A closed loop positional control system comprising in combination means for driving a load to a preselected one of a plurality of discreet positions, a potentiometer having a resistive element, a pick off wiper mounted relative thereto, a plurality of pairs of function generator wipers mounted in fixed relation relative to and symmetrically displaced about said pick off wiper for electrically engaging said resistive element of said potentiometer, a source of potential connected across each of said pairs of function generator wipers, means for preselecting one of a plurality of mutually exclusive points on the resistive element of said potentiometer corresponding to said preselected plurality of discreet positions, means linking said load driving means to said pick off and function generator wipers, means for generating a signal indicative of the directional velocity of said load, and means responsive to a signal derived from said potentiometer and a signal from said velocity signal generating means for controlling the operation of said load driving means to bring said load to a preselected one of the plurality of discreet positions.

References Cited by the Examiner

UNITED STATES PATENTS

| | | | |
|---|---|---|---|
| 2,701,328 | 2/1955 | Woodruff | 318—28 |
| 2,714,185 | 7/1955 | Woodruff | 318—28 |
| 2,954,517 | 9/1960 | Menzel | 323—74 |
| 2,992,387 | 7/1961 | Austin | 323—79 |
| 3,011,110 | 11/1961 | Yu-Chi et al. | 318—28 |
| 3,013,194 | 12/1961 | Cary | 318—28 |

JOHN F. COUCH, *Primary Examiner.*